US012737173B2

(12) United States Patent
Wisse

(10) Patent No.: US 12,737,173 B2
(45) Date of Patent: Sep. 15, 2026

(54) UPDATING A DEPLOYED APP METHOD AND SYSTEM

(71) Applicant: SIEMENS INDUSTRY SOFTWARE NETHERLANDS B.V., Rotterdam (NL)

(72) Inventor: Arjen Wisse, GN Hooglanderveen (NL)

(73) Assignee: Siemens Industry Software Netherlands B.V., Eindhoven (NL)

( * ) Notice: Subject to any disclaimer, the term of this patent is extended or adjusted under 35 U.S.C. 154(b) by 168 days.

(21) Appl. No.: 18/578,892

(22) PCT Filed: Jul. 12, 2021

(86) PCT No.: PCT/EP2021/069350
§ 371 (c)(1),
(2) Date: Jan. 12, 2024

(87) PCT Pub. No.: WO2023/284941
PCT Pub. Date: Jan. 19, 2023

(65) Prior Publication Data

US 2024/0256268 A1 Aug. 1, 2024

(51) Int. Cl.
*G06F 8/656* (2018.01)

(52) U.S. Cl.
CPC .................................... *G06F 8/656* (2018.02)

(58) Field of Classification Search
CPC ...................................................... G06F 8/656
See application file for complete search history.

(56) References Cited

U.S. PATENT DOCUMENTS 7,221,377 B1 * 5/2007 Okita ..................... G06Q 10/06 345/629
7,805,327 B1 * 9/2010 Schulz .................. G06F 9/5038 705/7.26

(Continued)

FOREIGN PATENT DOCUMENTS

| | | |
|---|---|---|
| CA | 2959528 A1 | 3/2016 |
| CN | 109740834 A | 5/2019 |

(Continued)

OTHER PUBLICATIONS

Cox Philip et al:; "Enhancing the Programmability of Spreadsheets with logic Programming"; CAADA; 2007 IEEE, pp. 87-94.

(Continued)

*Primary Examiner* — Francisco J Aponte
(74) *Attorney, Agent, or Firm* — Lempia Summerfield Katz LLC

(57) ABSTRACT

For an improved updating of deployed apps, a method is provided. The app is deployed on a target device and the app includes at least one current workflow that is processed by a computing platform, respectively. The method includes providing an app development user interface (UI) of an app development platform to a user. User's input relating to at least one amendment of the respective current workflow is captured in response to user interactions with the app development UI. At least one respective difference between the respective current workflow and the respective amended workflow is determined. The method determining if the determined respective difference is conflicting or non-conflicting. If the determined respective difference is determined to be non-conflicting, the method includes updating the respective current workflow to the respective amended workflow, and updating the deployed app on the target (Continued)

device. The updated app includes the respective updated workflow.

10 Claims, 5 Drawing Sheets

(56) References Cited

U.S. PATENT DOCUMENTS 8,209,564 B2 * 6/2012 Vidal ........................ G06F 8/65 714/38.1
8,335,773 B2 * 12/2012 Balko ....................... G06F 8/00 707/694
9,977,654 B2 * 5/2018 Coslovi .............. G06Q 10/0633
10,169,004 B2 * 1/2019 Khoyi ................. G06F 3/04847
10,175,951 B2 1/2019 Stanfill
10,191,728 B2 * 1/2019 Lee ........................... G06F 8/61
10,296,323 B2 * 5/2019 Pink .................... G06F 9/44521
10,698,733 B1 * 6/2020 Lee ..................... G06F 9/44505
10,754,637 B1 * 8/2020 Zeng ................... G06F 9/45558
10,891,569 B1 * 1/2021 Werner ............ G06Q 10/06316
10,896,034 B2 1/2021 Vinod
11,245,760 B2 * 2/2022 Fan ..................... H04L 67/1095
11,249,751 B2 2/2022 Sivadasan
11,435,871 B1 * 9/2022 Luvaas ............... G06F 3/04817
2006/0265706 A1 * 11/2006 Isaacson ................... G06F 8/61 717/174
2010/0293538 A1 * 11/2010 Wolf ......................... G06F 8/65 717/170
2011/0214021 A1 * 9/2011 Vidal .................. G06F 11/0715 714/E11.144
2016/0170739 A1 * 6/2016 Kapashikov ........ G06F 9/44521 717/168
2016/0202959 A1 * 7/2016 Doubleday ............... G06F 8/71 717/107
2017/0308363 A1 10/2017 Barsness
2017/0308457 A1 10/2017 Barsness
2019/0130325 A1 * 5/2019 Stevens .............. G06Q 10/0633
2019/0339959 A1 * 11/2019 Saha ................... G06F 9/45558
2020/0065152 A1 * 2/2020 Parmar ................ G06Q 10/103
2020/0159526 A1 5/2020 Sivadasan
2020/0174756 A1 * 6/2020 Cerar ........................ G06F 8/70
2020/0234242 A1 * 7/2020 Parks ........................ G06F 8/34
2020/0272433 A1 * 8/2020 Wang ........................ G06F 8/30
2021/0232990 A1 * 7/2021 Maunz ................. G02B 27/648
2022/0147344 A1 * 5/2022 Johnston ............... G06F 9/5027

FOREIGN PATENT DOCUMENTS

CN 114995846 A * 9/2022 ............ H04W 8/245
WO 2020098122 A1 5/2020

OTHER PUBLICATIONS

Grundy John et al:; "Inconsistency Management for Multiple-View Software Development Environments"; vol. 24; No. 11, Nov. 1998, pp. 960-981.
PCT International Search Report and Written Opinion of International Searching Authority mailed Mar. 31, 2022 corresponding to PCT International Application No. PCT/EP2021/069350.
Kraemer, F.A. (2011). Engineering Android Applications Based on UML Activities. In: Whittle, J., Clark, T., Kühne, T. (eds) Model Driven Engineering Languages and Systems. MODELS 2011.
Yen-Teh Hsia and A. L. Ambler, "Programming through pictorial transformations," Proceedings. 1988 International Conference on Computer Languages, Miami Beach, FL, USA, 1988, pp. 10-16.
Adam Fothergill Blog: "Resolution of a Submission Conflict" Apr. 23, 2015. pp. 1-6, with machine translation.
Shao Qunchao: "Mendix Agile Development Zero-Based Learning", Jan. 13, 2021. pp. 1-14, with machine translation.

* cited by examiner 100
122
150
162
160
118
106
104
114
116
122
120
124
122'
120'
Internal
Data
Store
Application Software
Component
Memory
Processor
112
110
120, 120'
140
108
102

100
150
122
160
162
118
108
Internal Data Store
120'
122'
124
120
122
102
Processor
Memory
Application Software Component
106
104
140
120, 120'
110
112
114
116
126

122
170
172
174A
174B
174C
174D
174E
174F
174G
174H
174I
176A
176B
176D
176E

1000
Display
1010
Graphics Controller
1008
Memory
1006
Processor
1002
Buses / Controllers
1004
Communication Controller
1012
Network
1014
Server
1034
I / O Controller
1016
Output Devices
1020
Input Devices
1018
Other Hardware
1022
Storage Controller
1024
Storage
OS
Software / Firmware
Data Store
1026
1028
1030
1032

UPDATING A DEPLOYED APP METHOD AND SYSTEM

This application is the National Stage of International Application No. PCT/EP2021/069350, filed Jul 12, 2021. The entire contents of this document are hereby incorporated herein by reference.

TECHNICAL FIELD

The present disclosure is directed, in general, to software management systems, and, more particularly, systems for updating deployed apps, that may be used to manage, build, test, deploy, and iterate such apps (collectively referred to herein as product systems).

BACKGROUND

Recently, an increasing number of computer software products is used both for personal needs and for business needs in the form of applications (throughout the present patent document, simply referred to as "apps"). Such apps may be used in a mobile context as well as on cloud computing platforms and "on premise," and may provide a specific set of functions. Such apps are developed and created (e.g., updating such an app that is deployed on a target device, such as a mobile or desktop platform).

Currently, there exist product systems and solutions that support updating deployed apps. Such product systems may benefit from improvements.

SUMMARY AND DESCRIPTION

Variously disclosed embodiments include methods and computer systems that may be used to facilitate updating a deployed app.

According to a first aspect of the present embodiments, a computer-implemented method of updating a deployed app, where the app is deployed on a target device, and where the app includes at least one current workflow which is processed by a computing platform, respectively, may include:

providing an app development user interface (UI) of an app development platform to a user for developing the app;

capturing the user's input relating to at least one amendment of the respective current workflow in response to user interactions with the app development UI;

determining at least one respective difference between the respective current workflow and the respective amended workflow;

determining if the determined respective difference is conflicting or non-conflicting;

if the determined respective difference is determined to be non-conflicting:

updating the respective current workflow to the respective amended workflow; and updating the deployed app on the target device, the updated app including the respective updated workflow.

According to a second aspect of the present embodiments, a computer system may be arranged and configured to execute the acts of this computer-implemented method of updating a deployed app. For example, the described computer system may be arranged and configured to execute the following acts:

providing an app development user interface (UI) of an app development platform to a user for developing the app;

capturing the user's input relating to at least one amendment of the respective current workflow in response to user interactions with the app development UI;

determining at least one respective difference between the respective current workflow and the respective amended workflow;

determining if the determined respective difference is conflicting or non-conflicting;

if the determined respective difference is determined to be non-conflicting:

updating the respective current workflow to the respective amended workflow; and updating the deployed app on the target device, the updated app including the respective updated workflow.

According to a third aspect of the present embodiments, a computer program product may include computer program code that, when executed by a computer system, cause the computer system to carry out this computer-implemented method of updating a deployed app.

According to a fourth aspect of the present embodiments, a computer-readable medium (e.g., a non-transitory computer-readable storage medium) may include computer program code that, when executed by a computer system, cause the computer system to carry out this computer-implemented method of updating a deployed app. By way of example, the described computer-readable medium may be non-transitory and may further be a software component on a storage device.

In some examples, the mentioned app development platform may be a (e.g., visual model-based and/or low-code) app development platform that is described in more detail below.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the detailed description below, it should be understood that various definitions for certain words and phrases are provided throughout this patent document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
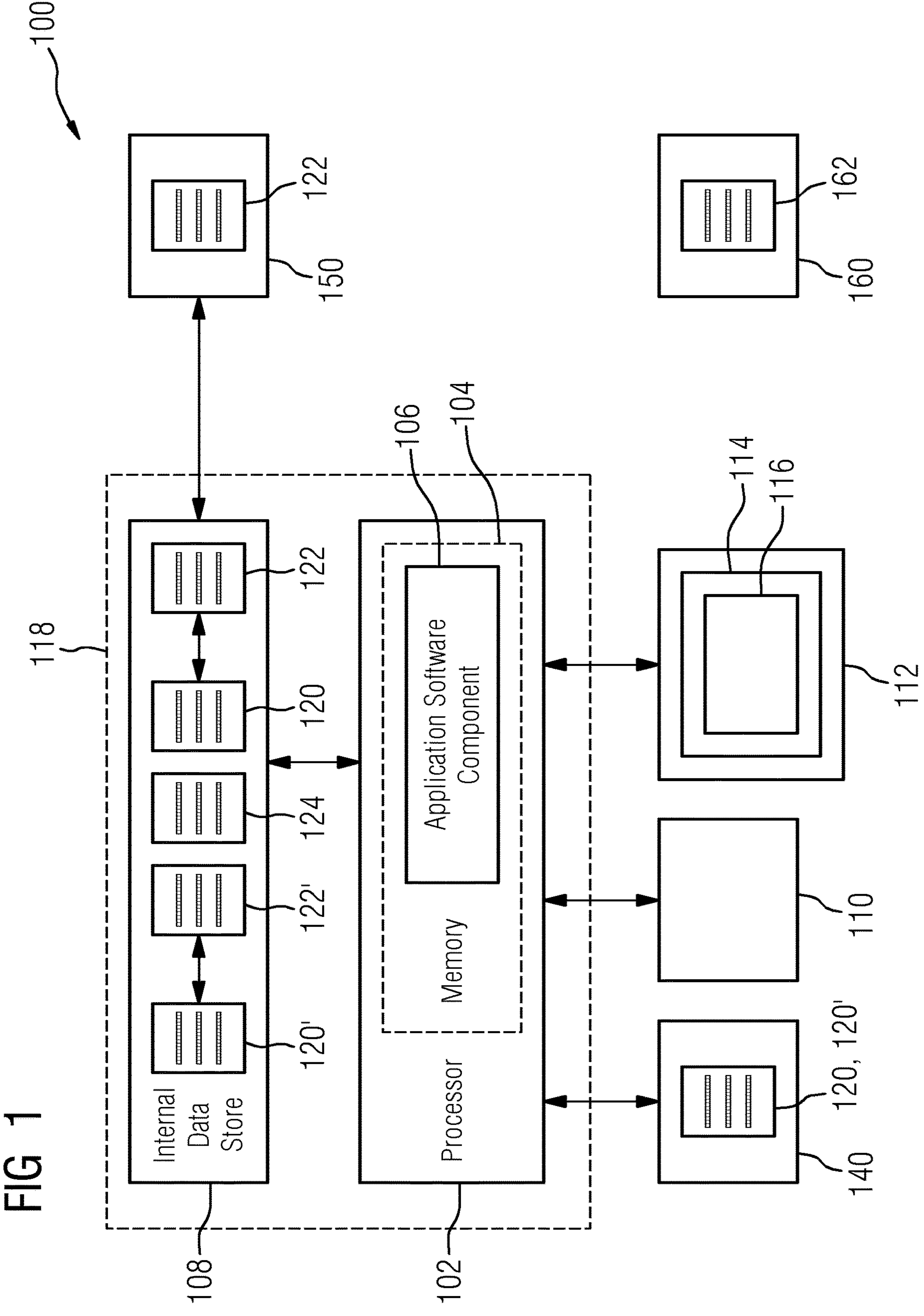
FIGS. 1 and 2 illustrate a functional block diagram of an example system that facilitates updating deployed apps in a product system, respectively.

Various technologies that pertain to systems and methods for updating deployed apps in a product system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. Functionality that is described as being carried out by certain system elements may be performed by multiple elements. Similarly, for example, an element may be configured to perform functionality that is described as being carried out by multiple elements. The numerous innovative teachings of the present patent document will be described with reference to non-limiting embodiments.

Apps, including native apps, may be created, edited, and represented using traditional source code. Examples of such traditional source code include C, C++, Java, Flash, Python, Perl, and other script-based methods of representing an app. Developing, creating and managing such script-based apps, or parts of such script-based apps may be accomplished by manual coding of suitably trained users.

Developers often use Application Development Frameworks ("ADFs") (which are by themselves applications or apps) for implementing/developing desired apps. An ADF provides a set of pre-defined code/data modules that may be directly/indirectly used in the development of an app. An ADF may also provide tools such as an Integrated Development Environment ("IDE"), code generators, debuggers, etc., which facilitate a developer in coding/implementing the desired logic of the app in a faster/simpler manner.

In general, an ADF simplifies app development by providing reusable components that may be used by app developers to define user interfaces ("UIs") and app logic by, for example, selecting components to perform desired tasks and defining the appearance, behavior, and interactions of the selected components. Some ADFs are based on a model-view-controller design pattern that promotes loose coupling and easier app development and maintenance.

According to another approach, apps may also be created, edited, and represented using visual model-based representations. Unlike traditional source code implementations, such apps may be created, edited, and/or represented by drawing, moving, connecting, and/or disconnecting visual depictions of logical elements within a visual modeling environment. Visual model-based representations of apps may use symbols, shapes, lines, colors, shades, animations, and/or other visual elements to represent logic, data or memory structures or user interface elements. In order to program a traditional script-based app, programmers are typically required to type out detailed scripts according to a complicated set of programming syntax rules. In contrast, programming a visual model-based app may, in some cases, be done by connecting various logical elements (e.g., action blocks and/or decision blocks) to create a visual flow chart that defines operation of the app. Similarly, defining data structures (e.g., variable types, database objects, or classes) and/or user interface elements (e.g., dropdown boxes, lists, text input boxes) in a visual model-based app may be done by drawing, placing, or connecting visual depictions of logical elements within a virtual workspace, as opposed to typing out detailed commands in a script. Visual-model based apps, including native apps, may therefore be more intuitive to program and/or edit compared to traditional script-based apps. In the present document, an approach is suggested to update deployed apps that may involve the explained visual model-based representations.

For brevity, references to a "model," a "visual model," or an "application" or "app" should be understood to refer to visual model-based apps, including native apps, unless specifically indicated. In some cases, such visual model-based apps may represent complete, stand-alone apps for execution on a computer system. Visual model-based apps may also represent discrete modules that are configured to perform certain tasks or functions, but do not represent complete apps; instead, such discrete modules may be inserted into a larger app or combined with other discrete modules to perform more complicated tasks. Examples of such discrete modules may include modules for validating a ZIP code, for receiving information regarding current weather from a weather feed, and/or for rendering graphics.

Visual models may be represented in two forms: an internal representation and one or more associated visual representations. The internal representation may be a file encoded according to a file format used by a modeling environment to capture and define the operation of an app (or part of an app). For example, the internal representation may define what inputs an app may receive, what outputs an app may provide, the algorithms and operations by which the app may arrive at results, what data the app may display, what data the app may store, etc. The internal representation may also be used to instruct an execution environment how to execute the logic of the app during runtime. Internal representations may be stored in the form of non-human-readable code (e.g., binary code). Internal representations may also be stored according to a binary stored JSON (java script object notation) format, and/or an XML format. At run-time, an execution engine may use an internal representation to compile and/or generate executable machine code that, when executed by a processor, causes the processor to implement the functionality of the model.

The internal representation may be associated with one or more visual representations. Visual representations may include visual elements that depict how an app's logic flows, but which are not designed may interact with the visual representation in order to show a desired level of detail (e.g., users may display or hide branches of logic, and/or display or hide sets of parameters). Details relating to an element of the visual model may be hidden from view by default but may appear in a sliding window or pop-up that appears on-screen when the user clicks on the appropriate element. Users may also zoom in or out of the model, and/or pan across different parts of the model, to examine different parts of the model. Users may also copy or paste branches of logic from one section of the model into another section, or copy/paste branches of logic from a first model into a second model. In some cases, parts of the model may contain links to other parts of the model, such that if a user clicks on a link, the user will automatically be led to another part of the model. A viewing user may interact with a visual representation in at least some of the same ways that the viewing user may interact with the model if the model were displayed within a modeling environment. In other words, the visual representation may be configured to mimic how the model would appear if the model were displayed within a visual modeling environment. A single internal representation may correspond to multiple visual representations that use different styles or formatting rules to display app logic. For example, multiple visual representations corresponding to the same internal representation may differ from one another in their use of color, elements that are comprised or omitted, and use of symbols, shapes, lines, colors, and/or shades to depict logic flow.

Approaches involving the above-described functionalities of visual model-based representations, visual model-based apps, and/or visual models may be understood to be comprised by a low-code development platform. By way of example, such a low-code development platform may further be described as software that provides a development environment used to create application software through graphical user interfaces and configuration instead of traditional hand-coded computer programming. A low-code model may enable developers of varied experience levels to create applications using a visual user interface in combination with model-driven logic. Such low-code development platforms may produce entirely operational apps or require additional coding for specific situations. Low-code development platforms may re-duce the amount of traditional hand coding, enabling accelerated delivery of business apps. A common benefit is that a wider range of people may contribute to the app's development, not only those with formal programming skills. Low-code development platforms may also lower the initial cost of setup, training, deployment, and maintenance.

With reference to FIG. 1, a functional block diagram of an example computer system or data processing system 100 is illustrated that facilitates updating a deployed app 120. The processing system 100 may include a (visual model-based) app development platform 118 including at least one processor 102 that is configured to execute at least one application software component 106 from a memory 104 accessed by the processor 102. Herein, the app development platform 118 may include the above-described functionalities of visual model-based representations, visual model-based apps, and/or visual models and, by way of example, be a visual model-based app development platform or a low-code app development platform. The application software component 106 may be configured (e.g, programmed) to cause the processor 102 to carry out various acts and functions described herein. For example, the described application software component 106 may include and/or correspond to one or more components of an app development application that is configured to generate and store product data in a data store 108 such as a database. Further, the described application software component 106 may include and/or correspond to one or more components of an app creation or development application.

By way of example, the app development platform 118 may be cloud-based, internet-based and/or be operated by a provider providing app development and creation support, including, for example, supporting low-code and/or visual model-based app development. The user may be located close to the app development platform 118 or remote to the app development platform 118 (e.g., anywhere else, such as using a mobile device for connecting to the app development platform 118, such as via the internet, wherein the mobile device may include an input device 110 and a display device 112. In some examples, the app development platform 118 may be installed and run on a user's device, such as a computer, laptop, pad, on-premises computing facility, or the like.

Examples of product systems that may be adapted to include the app creation and/or development or the update of a deployed app features described herein may include the low-code software development platform of Mendix Inc., of Boston, Massachusetts, USA. This platform provides tools to build, test, deploy, iterate, develop, create and manage apps 120 and is based on visual, model-driven software development. However, the systems and methods described herein may be used in other product systems (e.g., PLM, PDM, ALM systems) and/or any other type of system that generates and stores product data in a database. Also, examples of databases that may be used as one or more data stores described herein include database server applications such as Oracle, Microsoft SQL Server, or any other type of data store that is operative to store data records.

It may be difficult and time-consuming to update deployed apps 120 in complex app development and/or management environments. For example, advanced coding or software development or management knowledge of users may be required, or selections of many options need to be made consciously, both involving many manual steps, which is a long and in efficient process.

Herein, an app 120 may be understood as deployed if the activities that are required to make this app 120 available for use on the target device 140 by the end user using the deployed app 120 on his or her target device 140. The app deployment process may include several interrelated activities with possible transitions between them. These activities may occur at the producer side (e.g., "developer", cf. below) or at the consumer side (e.g., "end user", cf. below) or both. In some examples, the app deployment process may include at least the release of the app 120 and the installation and the activation of the app 120. The release activity may follow from the completed development process and is sometimes classified as part of the development process rather than deployment process. It may comprise operations required to prepare a system (e.g., the app development platform 118 or an on-line app store) for assembly and transfer to the computer system (s) (e.g., the target device 140) on which it will be run in production. Therefore, it may sometimes involve determining the resources required for the system to operate with tolerable performance and planning and/or documenting subsequent activities of the deployment process. For simple systems, the installation of the app 120 may involve establishing some form of command, shortcut, script or service for executing the software (e.g., manually or automatically) of the app 120. For complex systems, it may involve configuration of the system, possibly by asking the end user questions about its intended use, or directly asking the user how they would like it to be configured, and/or making all the required subsystems ready to use. Activation may be the activity of starting up the executable component of software or app 120 for the first time (which is not to be confused with the common use of the term activation concerning a software license, which is a function of Digital Rights Management systems.)

To enable the enhanced update of deployed apps 120, the described product system or processing system 100 may include at least one input device 110 and at least one display device 112 (e.g., a display screen). The described processor 102 may be configured to generate a graphical user interface (GUI) 114 through the display device 112. Such a GUI 114 may include GUI elements such as buttons, links, search boxes, lists, text boxes, images, scroll bars usable by a user to provide inputs through the input device 110 that cause updating the deployed app 120. By way of example, the GUI 114 may include an app development UI 116 provided to a user for developing the app 120.

In an example embodiment, the app 120 may be deployed on a target device 140. The (type of) target device 140 may, for example, be a mobile platform (e.g., a smartphone, smartwatch, handheld, pad, laptop or the like) or a desktop device (e.g., including desktop computers, or a desktop device, such as including desktop computers, or other "smart" devices, such as smart television sets, fridges, home or industrial automation devices, wherein smart television sets may be a television set with integrated Internet capabilities or a set-top box for television that offers more advanced computing ability and connectivity than a contemporary basic television set). The different kinds of platforms may involve different operating systems (e.g., linux, unix, iOS, macOS, Microsoft Windows or the like). The user ("app developer") developing the app 120 may be (and generally is) a different person than the user ("app customer,""customer user," or "end user") using or running the app 120 deployed on his or her target device 140. Unless specially indicated to the contrary, in the present patent document, a user may be understood to be an app developer developing or updating the app 120.

In some examples, the app 120 includes at least one current workflow 122 that is processed by a computing platform 150. The computing platform 150 may, for example, include cloud computing facilities, data centers or generally remote computing resources. Workflows may, for example, be long-running processes, for example, involving processes that may be in-progress, or actively running. In some examples, a workflow 122 may be paused until it gets an input from an end user or customer. For example, an employee sends a travel request (e.g., triggering the start of a corresponding travel approval workflow) and then the workflow is paused until a manager approves the request by clicking a button. In some examples of visual model-based app development platforms, workflows may be a visual way of processing logic in an app 120. A workflow 122 may look in this context like a flow chart. On a new workflow 122, a start event (e.g., a starting point of the workflow 122) and an end event (e.g., an endpoint of the workflow 122) may be created by default, whereby the app developer may add various activities to a flow of a workflow 122. Herein, this flow of actually executed workflow activities or the actual executed activities within a workflow instance may sometimes be called a path. Generally, a workflow 122 may define multiple possible paths, which depend on the data and the selected outcomes in a specific instance to become a path of executed activities.

Although illustrated with separate boxes in FIG. 1, the app 120 may include the workflow 122 so that the workflow's box 122 may be illustrated inside the app's box 120. In some examples, the app may run (at least partially) on the target device 140 (e.g., when the app 120 is a native app, which provides that it is targeted toward a particular mobile platform; accordingly, an app 120 intended for Apple devices does not run in Android devices. In other examples, for example, involving web-apps, the app 120 may also run on the computing platform 150 or its runtime.

Generally, a workflow 122 may allow to express the logic of an app 120. A workflow 122 may be considered to be a long-running, asynchronous process that is more high-level than microflows that are short-running and synchronous processes. In microflows, actions such as creating and updating objects, showing pages of the deployed app to the customer user, and making choices via an app UI on the user's target device 140 may be performed. Whereas microflows may be used for changing objects, calling external services or more generally, working with data, a workflow 122 is higher level since it may include such microflows and may involve (end) user tasks to get (end) user input on decisions.

In the context of the app development platform 118, especially a visual, model-based low-code app development platform 118, a workflow 122 may be a visual way of expressing what traditionally ends up in textual program code. In some examples, workflows 122 may run in the runtime server and may therefore not be used in offline apps. A workflow 122 may be composed of elements which may belong to the following categories: Events that may represent start and endpoints of a workflow 122 and special operations in a loop; flows that may form the connection between elements; decisions that may deal with making choices and merging different paths again; activities that may be the actions that are executed in a workflow; parameters which may be data that serves as input for the workflow 122; and annotations that may be elements that may be used to put comments in a workflow 122. As mentioned above, a workflow 122 may include a microflow, where microflow may include loops that may be used to iterate over a list of objects.

In some examples relating to industrial use cases, a workflow 122 may be provided with input data (e.g., from industrial automation hardware or software) such as measured data from sensors relating to physical or chemical quantities, such as temperature, electric voltage, electric current, position, speed, velocity, acceleration, acidity, particle concentration, etc. The mentioned input data may, in some examples, comprise data from one or more programmable logic controllers (PLCs), electric inverters, manufacturing operation management (MOM) systems, manufacturing execution systems (MES), enterprise resource planning (ERP) systems, supervisory control and data acquisition (SCADA) systems, product lifecycle management (PLM) systems, application lifecycle management (ALM) systems or the like. The workflow 122 and/or the app 120 may include business logic (e.g., a model) such as the models mentioned above in the context of model-based representations, model-based app development and model-based apps, or an algorithm to process the input data and to generate output data that may then be provided to the user and/or to the above-mentioned industrial automation hardware or software, including, by way of example, inverters, PLCs, MOM, MES, ERP, SCADA, PLM, ALM systems. In some industrial examples, the workflow 122 and/or the app 120 may be used to display, analyze, monitor, and/or control an industrial process that may be analyzed, monitored, and/or controlled by the above-mentioned industrial automation hardware or software.

In some examples, the respective workflow 122 may be processed by the app development platform 118 so that the app development platform 118 include the computing platform 150. In such cases, (e.g, if the respective workflow 122 is be processed by the app development platform 118), the respective workflow 122 may run in the runtime of the app development platform 118. The runtime may relate to a runtime system (e.g., runtime environment), which may primarily implement portions of an execution model. In some examples, workflows 122 may be executed or processed by a workflow engine that is part of a runtime server that runs apps. The runtime server may be comprised by the computing platform 150. The runtime may, in some examples, be the very instance of an execution model being applied to the developed program, (e.g., the respective workflow 122, which is itself then run in the aforementioned runtime system). The runtime system may have some responsibility for setting up and managing the stack and heap, and may include features such as garbage collection, threads, or other dynamic features built into the corresponding programming language.

In an example embodiment, the application software component 106 and/or the processor 102 may be configured to provide an app development user interface (UI) 116 of the app development platform 118 to a user for developing the app 120.

By way of example, the application software component 106 and/or the processor 102 may further be configured to capture the user's input relating to at least one amendment of the respective current workflow 122 in response to user interactions with the app development UI 116. Herein, the user may provide his or her input to define and configure the desired functionalities of the app 120 and/or the current workflow 122 that he or she is currently developing or updating. In some examples, to amend a current workflow, the user may add new activities, remove, amend, or re-order current activities of a respective workflow 122. Further, the user may, for example, input data sources and data consumers of the app 120 and rules or algorithms that are applied in the framework of the app 120 to process the data of the data sources to provide the desired data to the data consumers. Further, the user may provide input to shape the graphical user interface of the app 120 so that the app end user has a good user experience when running the app on his or her target device 140. By way of example, data sources of the app 120 may be data streams available on the internet or sensor data (e.g., from field devices of an industrial automation facility). Further, data consumers of the app 120 may be boxes of the graphical user interface of the app 120 including graphics and displays of the app 120 that may display processed information derived from the data obtained from the data sources.

In further examples, the application software component 106 and/or the processor 102 may further be configured to determine at least one respective difference 124 between the respective current workflow 122 and the respective amended workflow 122'. Herein, the respective difference 124 may correspond to the respective amendment made by the user.

In some examples, the application software component 106 and/or the processor 102 may further be configured to determine if the determined respective difference 124 is conflicting or non-conflicting. This provides that the respective differences 124 may be classified in conflicting differences 124 and non-conflicting differences 124. The (non-) conflicting differences 124 may relate to amendments to the current workflow 122 to obtain the amended workflow 122' that are such that an update from the current workflow 122 to the amended workflow 122' does (not) negatively affect the deployed app 120 when it is updated to also make use of the amended workflow 122', respectively.

For example, some conflicting differences 124 may lead to inconsistencies during the update of the deployed app 120, which may lead to the deployed app 120 outputting wrong data or crashing. Conflicting differences 124 may result in the situation that the system does not understand where to continue the workflow 122. Further, the situation may occur where the execution of the workflow 122 expects certain data to be available, while it is not.

Therefore, the conflict detection prevents such cases from being (wrongly) executed. When this happens, data that the program (e.g., the respective workflow 122 or the deployed app 120) was processing may be lost. Consequently, updating the respective workflow 122 and/or the deployed app 120 including a conflicting difference 124 may involve severe inconveniences for the end user of the app 120 deployed on the target device 140 and hence needs to be avoided.

In further examples, the application software component 106 and/or the processor 102 may further be configured, if the determined respective difference 124 is determined to be non-conflicting, to update the respective current workflow 122 to the respective amended workflow 122' and to update the deployed app 120 on the target device 140. The updated app 120' including the respective updated workflow 122'.

Herein, updating the respective current workflow 122 and the deployed app 120, respectively, may involve replacing the current version with the amended version, (e.g., the amended workflow 122' and the updated app 120', respectively). The suggested approach may be particularly beneficial for end users since it may provide that there is only one version of the respective workflow 120 that may be executed, whereby workflows 122 that on different versions, involving differences 124 between them, may need to be updated such that they may be executed again. This process, along with updates related to workflows 122 that only involve non-conflicting differences 124, may help to avoid the above-mentioned inconsistencies during the update of the workflow 122 or the deployed app 120 that may lead to the situation that the system does not understand where to continue the workflow 122 or the workflow 122 expects certain data to be available, while it is not.

The suggested approach may rather allow for a kind of upgrade 'in-progress' workflows 122, so that the workflows 122 may continue running on the latest version of the workflow 122. This approach may therefore allow workflows 122 and apps 120 to evolve after deployment, may further allow the deployment of amended workflows 122', and may provide that the amended workflow 122' is compatible with the current version of the app 120 being deployed.

Other approaches do not offer these advantages and conveniences to end users of the deployed app 120 since some other approaches don't handle versioning in the runtime and rather make it a developer user concern to not make changes breaking the backwards compatibility of a workflow 122 or an app 120. This other approach makes it hard to evolve workflows 122 or requires workflows 122 that should not change after deployment, leading to very inflexible apps that may not be able to be updated.

Another approach may involve keeping 'in-progress' workflows 122 running on the old version of the workflow 122. This other approach may lead to workflows 122 that may even become unexecutable after the app 120 has evolved, which regularly is a major inconvenience for end users of the app 120 on the target device 140.

In further examples, the respective amendment of the respective amended workflow 122' may relate to one or more amended workflow definitions, one or more amended workflow instances, and/or one or more amended workflow activities.

As already mentioned above, a workflow 122 may include a start event and an end in the event, whereby the user may add or edit various activities to the flow of the workflow 122. In the context of the activities, data relating to an item or entity of the workflow 122 may, for example, be input to the workflow 122, output from the workflow 122, or processed by the workflow 122. Herein, the item or entity may relate to a set of data to be processed by the workflow 122 and/or the app 120 and may, in some examples, relate to physical or chemical observables, (industrial) hardware or software. The item or entity may have properties or attributes, such as a data type including string, integer, character, Boolean type, etc.

A workflow definition may, in some examples, include a runtime representation of a workflow model. In further examples, a workflow definition may store information of the model (e.g., information that is essential for executing the workflow 122 or the app 120. In some examples, a workflow definition may include one or more workflow activities that are explained in more detail below. Herein, a workflow may include or be related to the path of a corresponding workflow 122, where the path may be a flow of workflows activities (e.g., such as explained in the context of FIG. 3). In such examples, and amendment of a workflow definition may involve deleting a workflow activity from the mentioned workflow path or introducing a parallel branch to the mentioned workflow path. In this context, changing the corresponding definition of a workflow 122 may, in some cases, lead to conflicting differences 124.

The workflow instance may, for example, relate to the above-mentioned model in the context of model-based representations, model-based app development, and model-based apps. By way of example, any time a new context is created based on some model, the model may have been instantiated. In practice, this instance may usually have a data structure in common with other instances, but the values stored in the instances are separate. Changing the values in one instance may then not interfere with the values of some other instance. Further, an instance and a workflow instance may be a concrete occurrence of any object (e.g., a workflow item or entity), existing usually during the runtime of a computer program (e.g., the workflow 122 or the deployed app 120). Formally, "instance" may be synonymous with "object," as they are each a particular value (e.g., realization), and these may be referred to as an instance object; "instance" emphasizes the distinct identity of the object. The creation of an instance is called instantiation. An object may be varied in a number of ways. Each realized variation of that object is an instance of its class. In other words, it may be a member of a given class that has specified values rather than variables. In a non-programming context, one may think of "dog" as a type and a particular dog as an instance of that class. In this context, changing the corresponding instance of a workflow 122 may, in some cases, lead to conflicting differences 124.

The workflow activities may include the activities of the workflow 122, which may be carried out between the start and the end of the workflow 122. The workflow activities may, for example, include the retrieval of input data, the output of output data, the interaction with the end user of the deployed app 120, the display of information to the end user of the deployed app 120 via an app user interface on the target device 140, or the processing of the input or intermediate data according to some algorithm, business logic (e.g., a model, such as the models mentioned in the context of model-based representations, model-based app development, and model-based apps). Changing a workflow activity of a workflow 122 may, in some cases, lead to conflicting differences 124.

In some examples, amending the workflow definitions may be most sensitive as amended workflow definitions may, in many cases, involve amended workflow instances and/or amended workflow activities and hence, more easily give rise to conflicting differences 124. It is advisable to handle amendments to workflow definitions particularly carefully.

In some examples, the application software component 106 and/or the processor 102 may further be configured to: determine a hash value for the respective workflow 122, 122', the hash value depending on a respective workflow activity identifier, a respective workflow activity type, parallel split branches, a respective workflow activity outcome identifier, or any combination thereof; and to compare the respective hash values of the respective current workflow 122 and the respective amended workflow 122' to identify a version change between the respective workflows 122, 122'.

The mentioned identifiers of the respective workflow activity and the respective workflow activity outcome may be unique identifiers that allow for unambiguous identification of the respective workflow activity and the respective workflow activity outcome. Herein, depending on the kind of workflow activity, the respective workflow activity outcome may be the collection of data input by the end user of the deployed app 120, the processing of input data according to the workflow 122, or the output of collected input data or processed data to an end user of the deployed app 120 via an app user interface on the target device 140.

Some examples of activity types have already been mentioned above and include the retrieval of input data, the output of output data, the interaction with the end user of the deployed app 120, the display of information to the end user of the deployed app 120 via an app user interface on the target device 140, or the processing of the input or intermediate data according to some algorithm, business logic (e.g., a model, such as the models mentioned in the context of model-based representations, model-based app development, and model-based apps).

Further, parallel split branches may be used to have parallel processes in a workflow 122. For example, when onboarding a new employee using an app 120, several processes of a corresponding app 120 may be running in parallel: the human resource department preparing necessary documents, the IT department preparing a workstation, and the administration department scheduling a training for the employee. In some examples, the hash value may depend on parallel split branches and may help to find structural changes between workflow versions. The hash value may be calculated over different workflow activities of branches of a parallel split. An example of a parallel split is also illustrated and explained in the context of FIG. 3.

Comparing the respective hash values of the current workflow 122 may be used to detect a version change between the respective workflows 122, 122', and hands may facilitate determining the above-mentioned differences 124.

In some examples, a "WorkflowDefinition" entity may have a 1:N association to a "WorkflowVersion" entity representing all the versions of that definition known to this deployment. The "WorkflowDefinition" entity may also have a N:1 association to the "WorkflowVersion" entity representing the current version of the "WorkflowDefinition" entity. Further, the "WorkflowVersion" entity may have a N:1 association to itself, representing the previous version.

Upon start of a workflow runtime, the hash value may be calculated, based on the respective workflow activity identifier, the respective workflow activity type, and/or the respective workflow activity outcome identifiers. This hash value may be used to detect whether the current (e.g., potentially amended) model or workflow 122 is still the same as the current version. If not, a new "WorkflowVersion" instance may be created that may reference the previous one, and the "WorkflowDefinition" entity may be changed to point to the new "WorkflowVersion" instance as its current version. The "WorkflowVersion" entity may store a simplified (e.g., minimized) copy of the model in one of its attributes, next to the calculated hash value in another attribute.

In further examples, the calculated hash value may also be used for performance optimization of the respective workflow 122. In some embodiments, comparing all the respective workflow activities may already be sufficient for determining the respective hash value and/or for detecting a version change between the respective workflows 122, 122'.

In some examples, the application software component 106 and/or the processor 102 may further be configured to: determine a list of all current workflow activities of the respective workflow 122; determine the respective instances of the workflow activities of the determined list; and identify a version change of the respective amended workflow 122', if at least one of the determined instances is not related to the respective amended workflow 122'.

In these examples, it may be tracked in which version the workflow activity is executed. The "Workflow" entity may also have two associations to "WorkflowActivity": one representing all activities executed in this workflow instance (e.g., the activities that are started, in-progress, or finished with no follow-up activity yet) and one representing the current activities (e.g., the activities that are started or in-progress). The "all activity" list of a "Workflow" instance may serve as an audit trail of actions performed in this Workflow instances history.

Further, a "WorkflowActivity" may point to a "WorkflowVersion". Using the list of current activities, the workflow engine may detect whether a workflow is in the current version, or an older version. For being in the current version, all current "WorkflowActivity" instances may need to point to the current "WorkflowVersion." This may happen before the workflow continues execution. When the workflow instance is still in the current version, the workflow may continue execution. When the workflow is in an older version, the workflow runtime may determine whether the version change results in version conflicts.

In further examples, the application software component 106 and/or the processor 102 may further be configured to determine at least one of the following differences 124 as non-conflicting difference 124: an addition of a workflow activity in a not yet executed path of the current workflow 122, a removal of a workflow activity in an executed path of the current workflow 122, a re-ordering of a workflow activity in an executed path of the current workflow 122, changes in the properties of a workflow activity or in the outcome of a workflow activity, an addition of an outcome in an exclusive split, of a call-microflow or of a user task activity, a change in a context entity, in a referenced microflow, in a referenced page or in a referenced workflow 122, or any combination thereof.

Generally, it may be considered not critical to add a workflow activity in a not yet executed path of the current workflow 122. The same may apply to a removal of a workflow activity or the re-ordering of a workflow activity in an already executed path of the current workflow 122. Also, not critical and hence involving non-conflicting differences 124 may be changes in the properties of a workflow activity or in the outcome of a workflow activity, such as: a change of a name, captions or titles; a change of referenced microflow in a call-microflow activity, or a referenced workflow 122 in the call-workflow activity; a change of a referenced page in a user task; a change of user targeting or user targeting mechanism in a user task; a change of due dates of a user task, etc.

In some examples, an exclusive split may involve making a choice based on a condition and follows (e.g., exactly) one of the outgoing sequence flows. For example, a workflow 122 or an app 120 including the workflow 122 may deal with handling customers that may have different customer statuses, such as platinum customer, gold customer, and standard customer. Then a workflow activity may depend on the respective customer's status, which may be realized with an exclusive split (e.g., triggering different workflow activities for customers having different customer statuses).

In some examples, the respective difference 124 may be considered non-conflicting if it concerns an aspect, such as workflow activities or workflow instances, of the respective workflow 122, which has not yet been executed. In such examples, the respective difference 124 may still be taken into account when the respective workflow 122 continues to be executed and may hence be considered non-conflicting.

In some examples, if there is an amendment to a workflow definition, there may be the check whether this amendment affects a workflow instance or workflow activity of the corresponding workflow 122. If this is not the case (e.g, if the workflow instance or workflow activity of the corresponding workflow 122 is not affected, such as not changed), the amendment to the workflow different may be considered to involve a non-conflicting difference 124.

Generally, as already explained above, for the respective non-conflicting difference 124, the respective current workflow 122 may be updated to the respective amended workflow 122', and the deployed app 120 may be updated on the target device 140 to the updated map 120' including the respective updated workflow 122'.

In some examples, the determination of the differences 124 may be facilitated if the application software component 106 and/or the processor 102 may further be configured to determine a list of all current workflow activities of the respective workflow 122, 122', and to determine the respective instances of the workflow activities of the determined list.

In further examples, if the respective determined difference 124 is determined to be non-conflicting, the application software component 106 and/or the processor 102 may further be configured to clone the respective current workflow activities to obtain respective updated workflow activities, and to execute the respective updated workflow activities and deactivating the respective current workflow activities.

For updating or upgrading the respective workflow 122, the respective current workflow activities may be cloned to obtain respective updated workflow activities. In some examples, the original current workflow activities may be put in the state "Replaced" and may be removed from the current workflow activities. The cloned variants of the current workflow activities may be marked as "migration activity" and may point to the latest "WorkflowDefinition" version. After this, the workflow execution may continue.

In some examples, the application software component 106 and/or the processor 102 may further be configured to determine at least one of the following differences 124 as conflicting difference 124: a removal of a current workflow activity in the current workflow definition, an introduction of a parallel branch in an already executed path, an introduction of a workflow activity in an already executed path, replacement or deletion of a selected workflow outcome, moving an already executed workflow activity to a position in the workflow definition that will cause the already executed workflow activity to be re-executed, a removal of a workflow definition, moving a current workflow activity outside a parallel branch, or any combination thereof.

Herein, moving the current workflow activity outside of parallel branch may involve removing this workflow activity from the parallel branch and adding it to some of the position of the top of the respective workflow 122, but still outside of the parallel branch.

In some examples, the respective difference 124 may be considered conflicting if it concerns an aspect, such as workflow activities or workflow instances, of the respective workflow 122 which has already been executed. In such examples, the respective difference 124 may no longer be taken into account or sometimes unintentionally may be taken into account twice or more times when the respective workflow 122 continues to be executed.

In some examples, the determination of the differences 124 may be facilitated if the application software component 106 and/or the processor 102 may further be configured to determine a list of all current workflow activities of the respective workflow 122, 122', and to determine the respective instances of the workflow activities of the determined list.

In further examples, the application software component 106 and/or the processor 102 may further be configured for: displaying at least one conflict resolution option 126 to the user via the app development UI 116 for a given conflicting difference 124 relating to a conflicting workflow 122, the at least one conflict resolution option 126 including at least one of aborting the given conflicting workflow 122, restarting the given conflicting workflow 122, continuing the given conflicting workflow 122, or any combination thereof; capturing the user's input relating to a selection of one of the displayed, at least one conflict resolution option 126 for the given conflicting workflow 122 in response to user interactions with the app development UI 116; to aborting, restarting or continuing the given conflicting workflow 122 according to the user's selected conflict resolution option 126.

By way of example, a respective conflicting difference 124 may be resolved by aborting, restarting, or continuing the conflicting workflow 122. In some examples, aborting the respective workflow 122 may make the respective workflow 122 no longer eligible for execution. Further, restarting the respective workflow 122 may restart the respective workflow 122 by marking the current in-progress workflow activities with the state "Replaced", including aborting in-progress tasks, and creating a new current activity for the workflow's start activity. In further examples, continuing the respective workflow 122 may continue the workflow by marking the current in-progress activities with the state "Replaced," and creating new activities (e.g., pointing to the current workflow version).

This may only be possible when the current in-progress workflow activities are still available in the workflow definition.

Herein, restarting the conflicting workflow 122 may resolve the conflict since the conflicting aspect of the workflow 122 may be executed from the beginning instead of no more executing this aspect if the workflow 122 is not restarted. If, without restarting, the conflicting workflow 122 leads to executing the conflicting aspect twice or more, the conflict may be resolved with restarting the conflicting workflow 122 since the conflicting aspect of the workflow 122 may be executed just once (as it generally should be) from the beginning.

In some examples, aborting or restarting a conflicting workflow 122 may (e.g., always) be available as a conflict resolution option 126, whereas continuing a conflicting workflow 122 may not always be available. In further examples, to resolve a conflict, the conflicting workflow 122 may be continued at another workflow activity than scheduled according to the regular flow of the path of the workflow 122. This may involve that the execution of this workflow 122 may be continued with an earlier, a later, or a parallel workflow activity than the normally scheduled workflow activity. In other words, the activities of the workflow 122 to continue with may be determined or selected by (e.g., developer or administrator) user. The workflow engine will let the workflow 122 jump to those workflow activities and continue execution from there.

The available conflict resolution option (s) 126 may be displayed via the app development UI 116 to a user (cf. e.g., FIG. 2) (e.g., the user developing the workflow 122 or the app 120, or an administrator user who has more experience and knowledge concerning workflows 122 and apps 120 and/or who has enhanced authorizations to select one of the displayed resolution option (s) 126 than a "regular" developer user).

The user (e.g., the developer user or the administrator user) may then select one of the displayed conflict resolution option (s) 126 and provide according input via his or her interactions with the app development UI 116. The conflict of the respective conflicting workflow 122 may then be resolved according to the corresponding input or selection of the user (e.g., by aborting, restarting or continuing the respective conflicting workflow 122).

In some examples, the respective, previously conflicting workflow or difference 124 may then be classified as non-conflicting.

In some examples, the application software component 106 and/or the processor 102 may further be configured to, during the development of the amended workflow app 122' or the amended app 120'; determine if the determined respective difference 124 is conflicting or non-conflicting; , display the at least one conflict resolution option 126 for the respective conflicting difference 124 to a user via the app development UI 116, the at least one conflict resolution option 126 including at least one of aborting the given conflicting workflow 122, re-starting the given conflicting workflow 122, continuing the given conflicting workflow 122, or any combination thereof; capture the user's input relating to a selection of one of the displayed at least one conflict resolution option 126 for the respective conflicting difference 124 in response to user interactions with the app development UI 116; and resolve the respective conflicting difference 124 according to the user's selected conflict resolution option 126.

Herein, during the development of the amended workflow 122' or the amended app 120' may provide that the mentioned steps may be performed during the design of the amended workflow 122' or the amended app 120'. In some examples, this involves that the mentioned steps may be performed before updating the workflow 122 or the amended app 120'. By way of example, the (developer) user may input his or her amendments of the respective current workflow 122 and then, depending on the user's input, the respective difference 124 may be determined and it may be determined if the determined respective difference 124 is conflicting on non-conflicting. Then, still during the development or the design of the amended workflow 122' or the amended app 120', the respective conflict resolution option (s) 126 may be displayed to the user via the app development UI 116, the (developer) user may input his or her selection of one of the displayed, respective conflict resolution option (s) 126, and eventually, the respective conflicting difference 124 may be resolved according to the user's selection.

Although, in some examples, the selection of one of the displayed conflict resolution option (s) 126 may be done by an administrator user, in many examples, the selection may be done by a developer user. The suitable selection may, in further examples, be facilitated for a developer user by recommending a certain conflict resolution option 126 (e.g., by highlighting this option). The recommendation may, in some examples, be to abort or restart a conflicting workflow 122 as these conflict resolution options 126 may, in some examples, (always) be available.

The approach of checking for conflicting differences 124 and resolving such conflicting differences 124 during the development or the design of the amended workflow 122' or the amended app 120' may, in some examples, allow a developer user to complete the development or update of the respective workflow 122 or the deployed app 120 without intervention of the administrator user. Hence, this approach may allow for a lean, convenient, reliable and fast development and update process of the corresponding workflow 122 of corresponding deployed app 120.

Further, this approach may allow the design time environment to detect potential conflicts between a deployed version of an app 120 and the current app version. This may result in suggestions for the developer user to define conflict resolutions before the current version of the app 120 will be deployed. Those resolutions may further include: indicating which activities the workflow engine should jump to when activities are deleted, and executing microflows to update the workflow context where necessary. Additionally, those resolutions may include the above-mentioned abortion, restart, or continuation of a conflicting workflow 122. The conflicting workflow 122 may be continued at another workflow activity than scheduled according to the regular flow of the path of the workflow 122 (e.g., by jumping to those workflow activities to continue with and then continue execution from there.

Deploying an app 120 with such a conflict resolution may then allow the workflow engine to automatically upgrade existing workflow instances and let them continue execution after the update or upgrade automatically. This mechanism may also circumvent the need for detecting the actual version changes as the differences are handled and mitigated in the design time.

In some examples, the respective, previously conflicting workflow or difference 124 may then be classified as non-conflicting.

In further examples, the application software component 106 and/or the processor 102 may further be configured to: determine the respective conflict resolution option 126 that is available for resolving the respective conflicting difference 124; and display the determined, respective conflict resolution option 126 for the respective conflicting difference 124 to a user via the app development UI 116.

As already mentioned above, in some examples, aborting or re-starting a conflicting workflow 122 may (always) be available as a conflict resolution option 126, whereas continuing a conflicting workflow 122 may not always be available. Hence, the availability of the respective conflict resolution option 126 may be determined and only the determined, and available conflict resolution option (s) 126 may be displayed to the user. Herein, the continuation of a conflicting workflow 122 may include continuing at or jumping to another workflow activity than scheduled according to the regular flow of the path of the workflow 122 as explained above.

Further, a computer-readable medium 160 that may include a computer program product 162 is shown in FIG. 1, where the computer program product 162 may be encoded with executable instructions, that when executed, cause the computer system 100 or and/or the app development platform 118 to carry out the described method.

Figure 2:
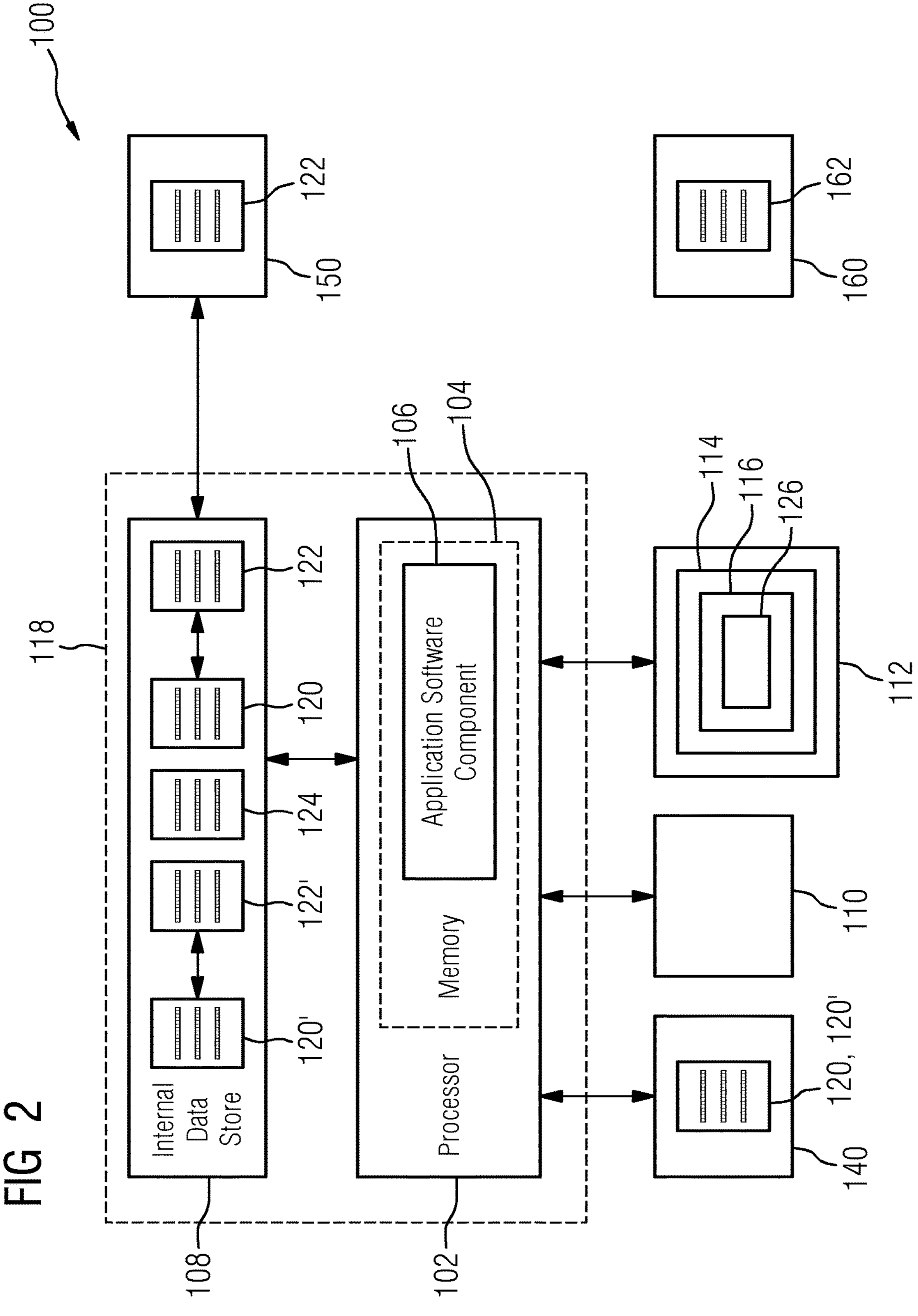

With reference to FIG. 2, a functional block diagram of another example computer system or data processing system 100 is illustrated that facilitates updating a deployed app 120. The processing system 100 may allow for functionalities similar to the ones allowed for by the processing system 100 illustrated and explained in the context of FIG. 1. Like in FIG. 1, the computer system or data processing system 100 may include the app development platform 118.

As illustrated in FIG. 2, the processing system 100 or the app development platform 118 may display the above-explained respective conflict resolution option (s) 126 to a user via the app development UI 116 and allow the user to provide his or her input relating to a selection of one of the displayed at least one conflict resolution option 126.

Figure 3:
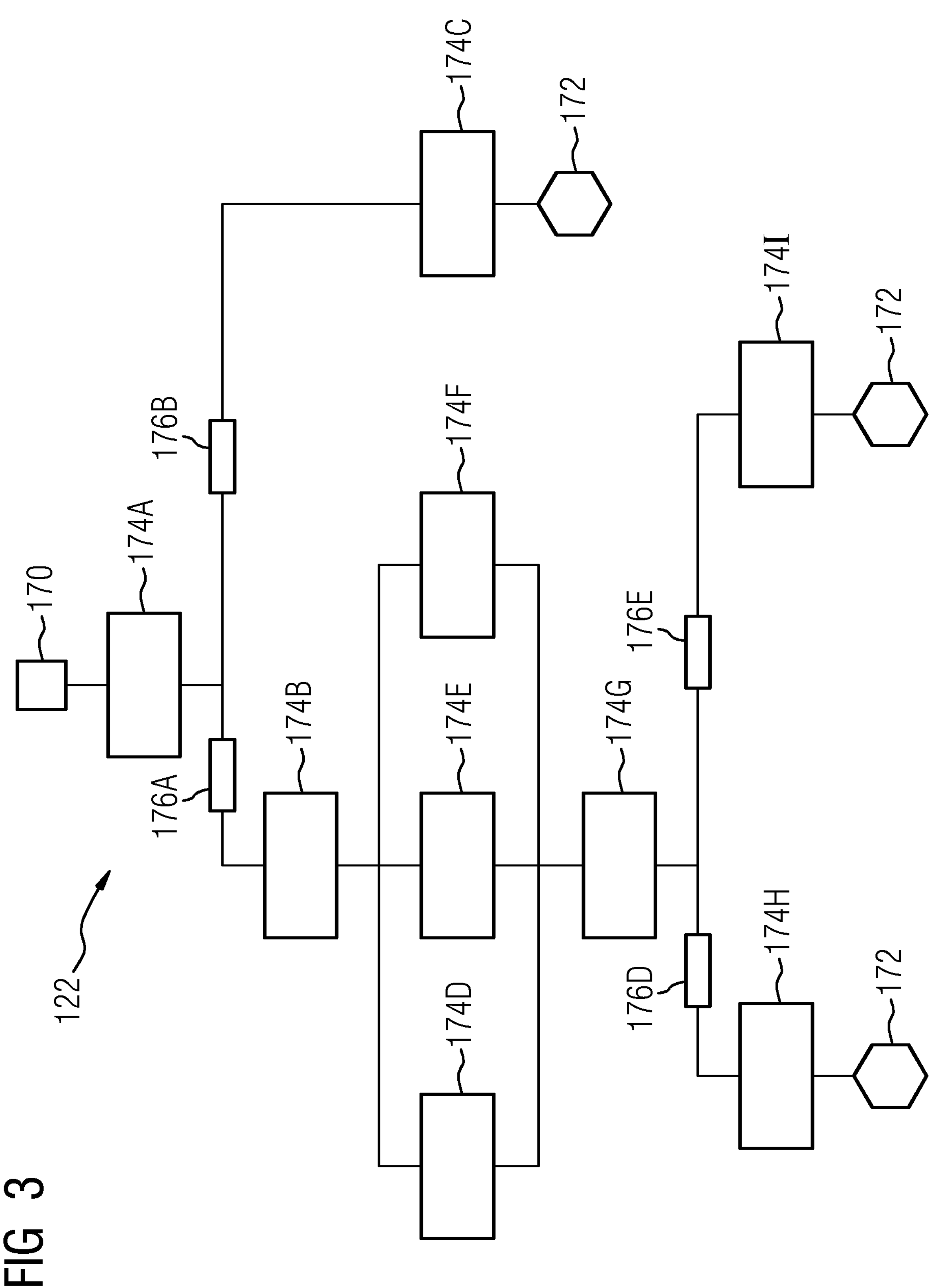
FIG. 3 illustrates a functional block diagram of an example workflow comprised by an example app.

With reference to FIG. 3, a functional block diagram of yet another example workflow 122 include by an example app 120 is illustrated. The workflow 122 may start at 170, comprise several workflow activities 174 and decisions 176, and end at different points at 172.

The illustrated workflow 122 may be used in the context of onboarding a customer or a customer's hardware device and handling the onboarding via the workflow 122 and the corresponding app 120 including the workflow 122, wherein the app 120 may be deployed on the customer user's respective target device 140. Herein, the onboarding of a hardware device may, for example, involve setting up a successful communication connection between the customer's IT or automation system and the hardware device. Thanks to a communication connection, the hardware device may, in some examples, send its operational data to the customer's IT or automation system or be controlled by the customer's IT or automation system.

After the start of the workflow 122 at 170, a first workflow activity 174A may check whether the customer or his or her hardware device is already available in an ERP system. If this is (not) the case, the checkpoint 176A (176B) is true (false), and the workflow 122 may continue at the next workflow activity 174B (174C). The workflow activity 174C may correspond to sending a notification (e.g., an email) to the customer indicating that the onboarding failed, followed by ending the workflow at 172. At workflow activity 174B, three parallel checks are started (e.g., for onboarding a customer (e.g., or a customer's hardware device): a passport check (e.g., a hardware device identifier check) at workflow activity 174D; an address check (e.g., a hardware device supplier check) at workflow activity 174E; and a photo check (a hardware device specifications check) at workflow activity 174F. Herein, the three workflow activities 174D, 174E, and 174F may correspond to a parallel split of the workflow 122 leading to parallel split branches. After merging these three workflow activities, the following workflow activity 174G may check whether all three checks have successfully been passed. If this is (not) the case, the checkpoint 176D (176E) is true (false), and the workflow 122 may continue at the next workflow activity 174H (174I), wherein the workflow activity 174H (174I) may correspond to onboarding the customer or his or her hardware device (e.g., sending an email to the customer that the onboarding failed), followed by ending the workflow at 172, respectively.

If amendments to this workflow 122 are made (e.g., amendments to the workflow definition, to one or more of the workflow activities 174 or to the workflow instances), the suggested method for updating deployed apps may be used, including: determining respective difference 124, determining if the respective difference 124 is conflicting or non-conflicting, and if the respective difference 124 is non-conflicting: updating the respective workflow 122 to the respective amended workflow 122' and the deployed app 120 on the target device 140 to the updated app 120' including the respective updated workflow 122'.

Figure 4:
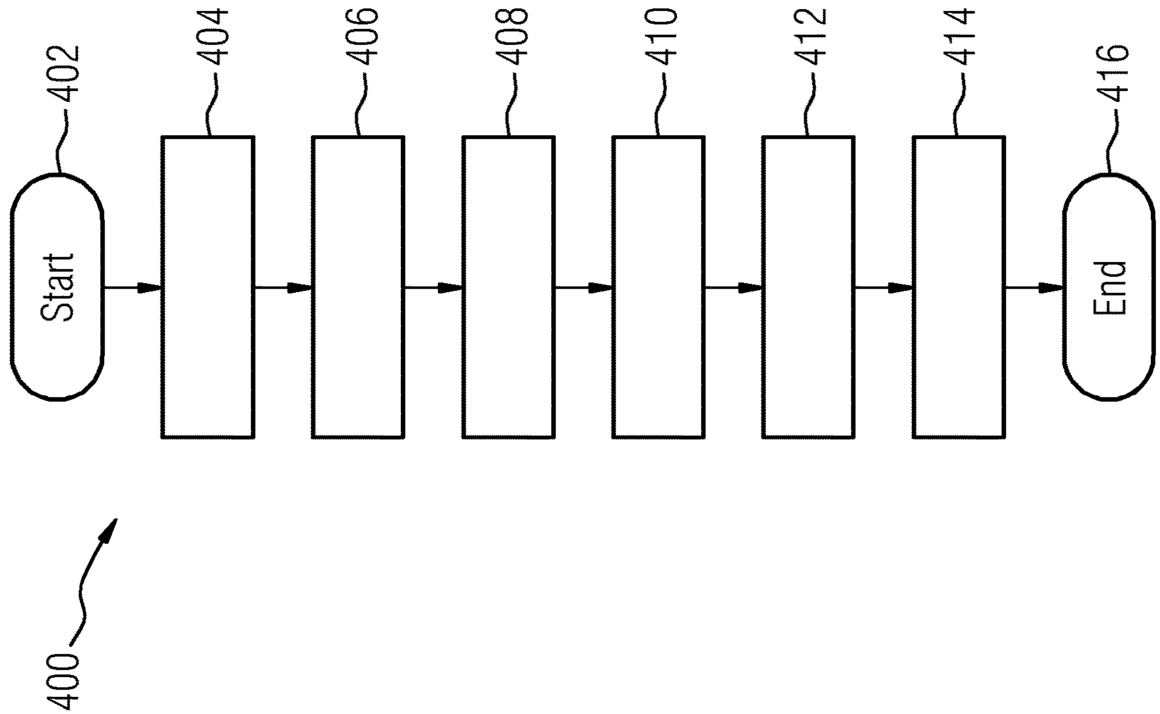
FIG. 4 illustrates a flow diagram of an example methodology that facilitates updating deployed apps in a product system.

FIG. 4 illustrates a flow diagram of an example methodology 400 that facilitates updating deployed apps 120 in a product system 110, 118, where the app 120 is deployed on a target device 140. The app 120 includes at least one current workflow 122 that is processed by a computing platform 150, respectively. The method may start at 402, and the methodology 400 may include several acts carried out through operation of at least one processor.

These acts may include: an act 404 of providing an app development user interface (UI) 116 of an app development platform 118 to a user for developing the app 120; an act 406 of capturing the user's input relating to at least one amendment of the respective current workflow 122 in response to user interactions with the app development UI 116; an act 408 of determining at least one respective difference 124 between the respective current workflow 122 and the respective amended workflow 122'; an act 410 of determining if the determined respective difference 124 is conflicting or non-conflicting; if the determined respective difference 124 is determined to be non-conflicting, an act 412 of updating the respective current workflow 122 to the respective amended workflow 122'; and an act 414 of updating the deployed app 120 on the target device 140, the updated app 120' including the respective updated workflow 122'. At 416, the methodology may end.

The methodology 400 may include other acts and features discussed previously with respect to the computer-implemented method of updating deployed apps 120.

For example, the methodology 400 may further include the acts of: determining a hash value for the respective workflow 122, 122', the hash value depending on a respective workflow activity identifier, a respective workflow activity type, parallel split branches, a respective workflow activity outcome identifier, or any combination thereof; and comparing the respective hash values of the respective current workflow 122 and the respective amended workflow 122' to identify a version change between the respective workflows 122, 122'.

In further examples, the methodology 400 may further include the act of determining at least one of the following differences 124 as non-conflicting difference 124: an addition of a workflow activity in a not yet executed path of the current workflow 122, a removal of a workflow activity in an executed path of the current workflow 122, a re-ordering of a workflow activity in an executed path of the current workflow 122, changes in the properties of a workflow activity or in the outcome of a workflow activity, an addition of an outcome in an exclusive split, of a call-microflow or of a user task activity, a change in a context entity, in a referenced microflow, in a referenced page or in a referenced workflow 122, or any combination thereof.

In some examples, the methodology 400 may further include, if the respective determined difference 124 is determined to be non-conflicting—the acts of cloning the respective current workflow activities to obtain respective updated workflow activities, and of executing the respective updated workflow activities and deactivating the respective current workflow activities.

In some examples, the methodology 400 may further include the act of determining at least one of the following differences 124 as conflicting difference 124: a removal of a current workflow activity in the current workflow definition, an introduction of a parallel branch in an already executed path, an introduction of a workflow activity in an already executed path, replacement or deletion of a selected workflow outcome, moving an already executed workflow activity to a position in the workflow definition that will cause the already executed workflow activity to be re-executed, a removal of a workflow definition, moving a current workflow activity outside a parallel branch, or any combination thereof.

In further examples, the methodology 400 may further include the acts of displaying at least one conflict resolution option 126 to the user via the app development UI 116 for a given conflicting difference 124 relating to a conflicting workflow 122. The at least one conflict resolution option 126 includes: aborting the given conflicting workflow 122, restarting the given conflicting workflow 122, continuing the given conflicting workflow 122, or any combination thereof; capturing the user's input relating to a selection of one of the displayed, at least one conflict resolution option 126 for the given conflicting workflow 122 in response to user interactions with the app development UI 116; and aborting, restarting, or continuing the given conflicting workflow 122 according to the user's selected conflict resolution option 126.

In some examples, the methodology 400 may further include, during the development of the amended workflow app 122', or the amended app 120'—the acts of: determining at least one respective difference 124 between the respective current workflow 122 and the respective amended workflow 122'; determining if the determined respective difference 124 is conflicting or non-conflicting; displaying the at least one conflict resolution option 126 for the respective conflicting difference 124 to a user via the app development UI 116, the at least one conflict resolution option 126 including aborting the given conflicting workflow 122, re-starting the given conflicting workflow 122, continuing the given conflicting workflow 122, or any combination thereof; capturing the user's input relating to a selection of one of the displayed at least one conflict resolution option 126 for the respective conflicting difference 124 in response to user interactions with the app development UI 116; and resolving the respective conflicting difference 124 according to the user's selected conflict resolution option 126.

In some examples, the methodology 400 may further include the acts of, determining the respective conflict resolution option 126 that is available for resolving the respective conflicting difference 124; and displaying the determined, respective conflict resolution option 126 for the respective conflicting difference 124 to a user via the app development UI 116.

As discussed previously, acts associated with these methodologies (e.g., other than any described manual acts such as an act of manually making a selection through the input device) may be carried out by one or more processors. Such processor (s) may be comprised in one or more data processing systems, for example, that execute software components operative to cause these acts to be carried out by the one or more processors. In an example embodiment, such software components may include computer-executable instructions corresponding to a routine, a sub-routine, programs, applications, modules, libraries, a thread of execution, and/or the like. Further, software components may be written in and/or produced by software environments/languages/frameworks such as Java, Javascript, Python, C, C #, C++ or any other software tool capable of producing components and graphical user interfaces configured to carry out the acts and features described herein.

Figure 5:
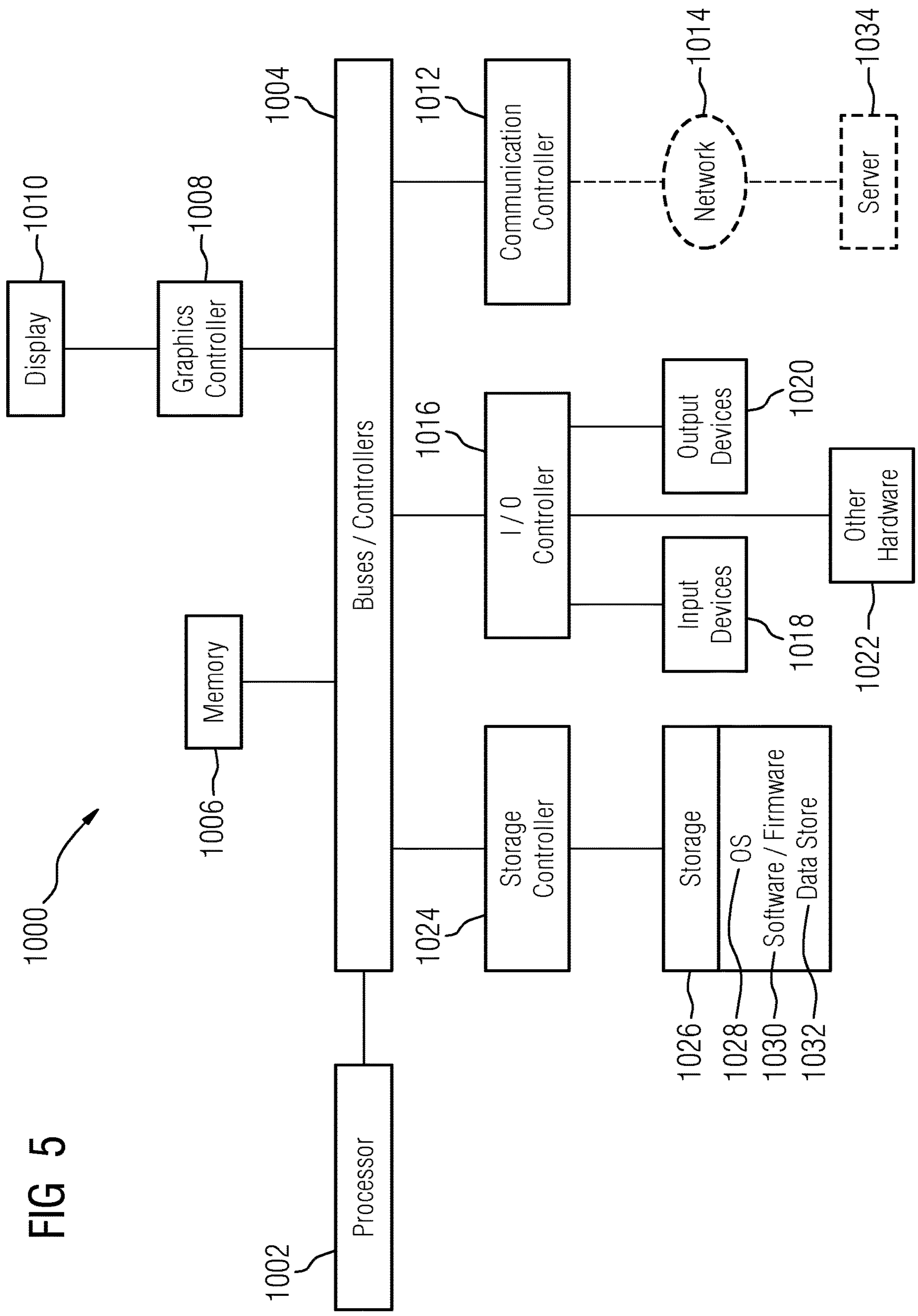
FIG. 5 illustrates a block diagram of a data processing system in which an embodiment may be implemented.

FIG. 5 illustrates a block diagram of a data processing system 1000 (also referred to as a computer system) in which an embodiment may be implemented, for example, as a portion of a product system, and/or other system operatively configured by software or otherwise to per-form the processes as described herein. The data processing system 1000 may include, for example, the app development platform 118 and/or the computer system or data processing system 100 mentioned above. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. In some embodiments, one or more controllers (e.g., graphics, south bridge) may be integrated with the CPU (e.g., on the same chip or die). Examples of CPU architectures include IA-32, x86-64, and ARM processor architectures.

Other peripherals connected to one or more buses may include communication controllers 1012 (e.g, Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (e.g., connected to speakers and/or microphones). Various peripherals may be connected to the I/O controller (s) (e.g., via various ports and connections) including input devices 1018 (e.g., keyboard, mouse, pointer, touch screen, touch pad, drawing tablet, trackball, buttons, key-pad, game controller, gamepad, camera, microphone, scanners, motion sensing devices that capture motion gestures), output devices 1020 (e.g., printers, speakers), or any other type of device that is operative to provide inputs to or receive outputs from the data processing system. Many devices referred to as input devices or output devices may both provide inputs and receive outputs of communications with the data processing system. For example, the processor 1002 may be integrated into a housing (such as a tablet) that includes a touch screen that serves as both an input and display device. Further, some input devices (such as a laptop) may comprise a plurality of different types of input devices (e.g., touch screen, touch pad, keyboard). Also, other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated re-movable media, which may be any suitable non-transitory machine usable or machine-readable storage medium. Examples include nonvolatile devices, volatile devices, read only devices, writable devices, ROMs, EPROMs, magnetic tape storage, floppy disk drives, hard disk drives, solid-state drives (SSDs), flash memory, optical disk drives (e.g., CDS, DVDS, Blu-ray), and other known optical, electrical, or magnetic storage devices drives and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (e.g., that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 1012 may be connected to the network 1014 (e.g., not a part of data processing system 1000), which may be any public or private data processing system network or combination of networks, as known to those of skill in the art, including the Internet. Data processing system 1000 may communicate over the network 1014 with one or more other data processing systems such as a server 1034 (e.g., also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when refer-ring to a data processing system, such a system may be implemented across several data processing systems organized in a distributed system in communication with each other via a network.

Further, the term "controller" may be any device, system or part thereof that controls at least one operation, whether such a device is implemented in hardware, firmware, software or some combination of at least two of the same. The functionality associated with any particular controller may be centralized or distributed, whether locally or remotely.

In addition, data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, the processor described herein may be located in a server that is remote from the display and input devices described herein. In such an example, the described display device and input device may be comprised in a client device that communicates with the server (e.g., and/or a virtual machine executing on the server) through a wired or wireless network (e.g., which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCOIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein, a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Also, the words or phrases used herein should be construed broadly, unless expressly limited in some examples. For example, the terms "include" and "comprise," as well as derivatives thereof, provide inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, providing and/or, unless the context clearly indicates otherwise. The phrases "associated with" and "associated therewith," as well as derivatives thereof, may be to comprise, be comprised within, interconnect with, contain, be contained within, connect to or with, couple to or with, be communicable with, cooperate with, interleave, juxtapose, be proximate to, be bound to or with, have, have a property of, or the like.

Also, although the terms "first," "second," "third" and so forth may be used herein to describe various elements, functions, or acts, these elements, functions, or acts should not be limited by these terms. Rather these numeral adjectives are used to distinguish different elements, functions or acts from each other. For example, a first element, function, or act may be termed a second element, function, or act, and, similarly, a second element, function, or act may be termed a first element, function, or act, without departing from the scope of the present disclosure.

In addition, phrases such as "processor is configured to" carry out one or more functions or processes, may be that the processor is operatively configured to or operably configured to carry out the functions or processes via software, firmware, and/or wired circuits. For example, a processor that is configured to carry out a function/process may correspond to a processor that is executing the software/firmware, that is programmed to cause the processor to carry out the function/process and/or may correspond to a processor that has the software/firmware in a memory or storage device that is available to be executed by the processor to carry out the function/process. A processor that is "configured to" carry out one or more functions or processes may also correspond to a processor circuit particularly fabricated or "wired" to carry out the functions or processes (e.g., an ASIC or FPGA design). Further, the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may provide that an element is relatively near to but not in contact with a further element, or that the element is in contact with the further portion, unless the context clearly indicates otherwise.

Although example embodiments of the present disclosure have been described in detail, those skilled in the art will understand that various changes, substitutions, variations, and improvements disclosed herein may be made without departing from the spirit and scope of the disclosure in its broadest form.

None of the description in the present patent document should be read as implying that any particular element, step, act, or function is an essential element, that must be comprised in the claim scope: the scope of patented subject matter is defined only by the allowed claims.

The elements and features recited in the appended claims may be combined in different ways to produce new claims that likewise fall within the scope of the present invention. Thus, whereas the dependent claims appended belwo depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing descritpion be regarded as illustrative rather than limiting, and that it be understood that all equivalents and/or combinations or embodiments are intended to be included in this description.

The invention claimed is:

1. A method of updating a deployed app, wherein the deployed app is deployed on a target device, wherein the deployed app comprises at least one current workflow that is processed by a computing platform, respectively, the method being computer-implemented and comprising:

providing an app development user interface (UI) of an app development platform to a user for developing the deployed app;

capturing user input of the user relating to at least one amendment of the respective current workflow in response to user interactions with the app development UI;

determining at least one respective difference between the respective current workflow and a respective amended workflow;

determining if the determined respective difference is conflicting or non-conflicting; and when the respective difference is determined to be non-conflicting:

updating the respective current workflow to the respective amended workflow; and updating the deployed app on the target device, the updated deployed app comprising the respective updated workflow, wherein the respective amendment of the respective amended workflow is relatable to one or more amended workflow definitions, one or more amended workflow instances, one or more amended workflow activities, or any combination thereof, and wherein the method further comprises:

determining at least one of the following differences as a non-conflicting difference:

an addition of a workflow activity in a not yet executed path of the current workflow;

a removal of a workflow activity in an executed path of the current workflow;

a re-ordering of a workflow activity in an executed path of the current workflow;

changes in properties of a workflow activity or in an outcome of a workflow activity;

an addition of an outcome in an exclusive split, of a call-microflow, or of a user task activity;

a change in a context entity, in a referenced microflow, in a referenced page, or in a referenced workflow; or any combination thereof.

2. The method of claim 1, further comprising:

determining a hash value for the respective workflow, the hash value depending on a respective workflow activity identifier, a respective workflow activity type, parallel split branches, a respective workflow activity outcome identifier, or any combination thereof, and comparing the respective hash values of the respective current workflow and the respective amended workflow, such that a version change between the respective workflows is identified.

3. The method of claim 1, further comprising:

determining a list of all current workflow activities of the respective workflow;

determining the respective instances of the workflow activities of the determined list; and identifying a version change of the respective amended workflow when at least one of the determined instances is not related to the respective amended workflow.

4. The method of claim 1, further comprising, when the respective determined difference is determined to be non-conflicting:

cloning the respective current workflow activities, such that respective updated workflow activities are obtained; and executing the respective updated workflow activities and deactivating the respective current workflow activities.

5. The method of claim 1, further comprising:

determining as conflicting difference:

a removal of a current workflow activity in the current workflow definition;

an introduction of a parallel branch in an already executed path;

an introduction of a workflow activity in an already executed path;

replacement or deletion of a selected workflow outcome;

moving an already executed workflow activity to a position in the workflow definition that will cause the already executed workflow activity to be re-executed;

a removal of a workflow definition;

moving a current workflow activity outside a parallel branch; or any combination thereof.

6. The method of claim 1, further comprising:

displaying at least one conflict resolution option to the user via the app development UI for a given conflicting difference relating to a conflicting workflow, wherein the at least one conflict resolution option comprises aborting the given conflicting workflow, restarting the given conflicting workflow, continuing the given conflicting workflow, or any combination thereof;

capturing user input relating to a selection of one of the displayed, at least one conflict resolution option for the given conflicting workflow in response to user interactions with the app development UI; and aborting, restarting, or continuing the given conflicting workflow according to the selected at least one conflict resolution option for the given conflicting workflow.

7. The method of claim 6, further comprising, during the development of the amended workflow app or the amended app:

determining at least one respective difference between the respective current workflow and the respective amended workflow;

determining when the determined respective difference is conflicting or non-conflicting;

displaying the at least one conflict resolution option for the respective conflicting difference to a user via the app development UI, the at least one conflict resolution option comprising aborting the given conflicting workflow, restarting the given conflicting workflow, continuing the given conflicting workflow, or any combination thereof;

capturing user input relating to a selection of one of the displayed at least one conflict resolution option for the respective conflicting difference in response to user interactions with the app development UI; and resolving the respective conflicting difference according to the selected at least one conflict resolution option for the respective conflicting differences.

8. The method of claim 7, further comprising:

determining the respective conflict resolution option that is available for resolving the respective conflicting difference; and displaying the determined, respective conflict resolution option for the respective conflicting difference to a user via the app development UI.

9. A computer system comprising:

a processor configured to update a deployed app, wherein the deployed app is deployed on a target device, wherein the deployed app comprises at least one current workflow that is processed by a computing platform, respectively, the processor being configured to update the deployed app comprising the processor being configured to:

provide an app development user interface (UI) of an app development platform to a user for developing the deployed app;

capture user input relating to at least one amendment of the respective current workflow in response to user interactions with the app development UI;

determine at least one respective difference between the respective current workflow and a respective amended workflow;

determine if the determined respective difference is conflicting or non-conflicting; and when the respective difference is determined to be non-conflicting:

update the respective current workflow to the respective amended workflow; and update the deployed app on the target device, the updated deployed app comprising the respective updated workflow, wherein the respective amendment of the respective amended workflow is relatable to one or more amended workflow definitions, one or more amended workflow instances, one or more amended workflow activities, or any combination thereof, and wherein the processor is further configured to:

determine at least one of the following differences as a non-conflicting difference:

an addition of a workflow activity in a not yet executed path of the current workflow;

a removal of a workflow activity in an executed path of the current workflow;

a re-ordering of a workflow activity in an executed path of the current workflow;

changes in properties of a workflow activity or in an outcome of a workflow activity;

an addition of an outcome in an exclusive split, of a call-microflow, or of a user task activity;

a change in a context entity, in a referenced microflow, in a referenced page, or in a referenced workflow; or any combination thereof.

10. In a non-transitory computer-readable storage medium that stores instructions executable by a computer system to update a deployed app, wherein the deployed app is deployed on a target device, wherein the deployed app comprises at least one current workflow that is processed by a computing platform, respectively, the instructions comprising:

providing an app development user interface (UI) of an app development platform to a user for developing the deployed app;

capturing user input relating to at least one amendment of the respective current workflow in response to user interactions with the app development UI;

determining at least one respective difference between the respective current workflow and a respective amended workflow;

determining if the determined respective difference is conflicting or non-conflicting; and when the respective difference is determined to be non-conflicting:

updating the respective current workflow to the respective amended workflow; and updating the deployed app on the target device, the updated deployed app comprising the respective updated workflow, wherein the respective amendment of the respective amended workflow is relatable to one or more amended workflow definitions, one or more amended workflow instances, one or more amended workflow activities, or any combination thereof, and wherein the instructions further comprise:

determining at least one of the following differences as a non-conflicting difference:

an addition of a workflow activity in a not yet executed path of the current workflow;

a removal of a workflow activity in an executed path of the current workflow;

a re-ordering of a workflow activity in an executed path of the current workflow;

changes in properties of a workflow activity or in an outcome of a workflow activity;

an addition of an outcome in an exclusive split, of a call-microflow, or of a user task activity;

a change in a context entity, in a referenced microflow, in a referenced page, or in a referenced workflow; or any combination thereof.

* * * * *